(12) United States Patent
Yen et al.

(10) Patent No.: US 8,698,780 B2
(45) Date of Patent: Apr. 15, 2014

(54) OPTICAL TOUCH APPARATUS WITH NOISE SUPPRESSING FUNCTION AND METHOD OF OPERATING THE SAME

(75) Inventors: Meng-Shin Yen, Taipei (TW); William Wang, Taoyuan (TW); Chung-Cheng Chou, Taoyuan County (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 349 days.

(21) Appl. No.: 12/813,175

(22) Filed: Jun. 10, 2010

(65) Prior Publication Data

US 2010/0315380 A1    Dec. 16, 2010

(30) Foreign Application Priority Data

Jun. 16, 2009  (TW) ................................ 98120098 A

(51) Int. Cl.
*G06F 3/042* (2006.01)
*G06F 3/044* (2006.01)

(52) U.S. Cl.
USPC ....................................... 345/175; 178/18.09

(58) Field of Classification Search
USPC ........................................ 345/175; 178/18.09
See application file for complete search history.

(56) References Cited

U.S. PATENT DOCUMENTS

| | | | | |
|---|---|---|---|---|
| 3,673,327 A * | 6/1972 | Johnson et al. | ................ | 345/175 |
| 4,774,404 A * | 9/1988 | Hasegawa et al. | ............ | 345/175 |
| 4,868,550 A * | 9/1989 | Sasaki et al. | ................... | 345/175 |
| 5,515,083 A * | 5/1996 | Casebolt et al. | .............. | 345/175 |
| 5,914,709 A * | 6/1999 | Graham et al. | ................ | 345/175 |
| 6,538,644 B1 * | 3/2003 | Muraoka | ......................... | 345/175 |
| 6,597,348 B1 * | 7/2003 | Yamazaki et al. | ............ | 345/175 |
| 6,597,508 B2 * | 7/2003 | Seino et al. | .................... | 345/175 |
| 6,677,934 B1 * | 1/2004 | Blanchard | ...................... | 345/175 |
| 6,972,753 B1 * | 12/2005 | Kimura et al. | ................. | 345/175 |
| 6,992,659 B2 * | 1/2006 | Gettemy | ......................... | 345/175 |
| 7,099,553 B1 * | 8/2006 | Graham et al. | ................ | 345/175 |
| 7,265,748 B2 * | 9/2007 | Ryynanen | ...................... | 345/175 |
| 7,412,119 B2 * | 8/2008 | Smits | ............................. | 345/175 |
| 7,656,391 B2 * | 2/2010 | Kimura et al. | ............. | 178/18.09 |
| 7,786,983 B2 * | 8/2010 | Graham | ......................... | 345/175 |
| 7,880,732 B2 * | 2/2011 | Goertz | ........................... | 345/175 |
| 8,130,202 B2 * | 3/2012 | Levine et al. | ................. | 345/175 |
| 2004/0145575 A1 * | 7/2004 | Weindorf et al. | ............. | 345/173 |
| 2004/0201579 A1 * | 10/2004 | Graham | ........................ | 345/175 |
| 2005/0128190 A1 * | 6/2005 | Ryynanen | ...................... | 345/173 |
| 2005/0225501 A1 * | 10/2005 | Srinivasan et al. | ............. | 345/32 |
| 2008/0111796 A1 * | 5/2008 | Atkins et al. | .................. | 345/175 |
| 2008/0198144 A1 * | 8/2008 | Shimizu et al. | ............... | 345/175 |
| 2008/0225017 A1 * | 9/2008 | Kim et al. | ...................... | 345/175 |
| 2008/0252619 A1 * | 10/2008 | Crockett et al. | ............. | 345/175 |
| 2008/0278460 A1 * | 11/2008 | Arnett et al. | .................. | 345/175 |
| 2009/0102815 A1 * | 4/2009 | Juni | ................................ | 345/175 |
| 2009/0225059 A1 * | 9/2009 | Juni | ................................ | 345/175 |

FOREIGN PATENT DOCUMENTS

JP          09-212303    *    2/1996    ............. G06F 3/033

* cited by examiner

*Primary Examiner* — Adam J Snyder

(57) ABSTRACT

An optical touch apparatus is disclosed. The optical touch apparatus comprises a light emitting module, a noise suppressing module, a light sensing module, and a processing module. The light emitting module emits at least one sensing beam, and the at least one sensing beam comprises a plurality of sensing rays. If an emitting angle of a specific sensing ray among the plurality of sensing rays toward a light sensor of the light sensing module is larger than a default value, the noise suppressing module will block the specific sensing ray from emitting into the light sensor. After the light sensing module generates a sensing result according to the condition of the light sensing module receiving the at least one sensing beam, the processing module will determine the position of a touch point according to the sensing result.

28 Claims, 6 Drawing Sheets

OPTICAL TOUCH APPARATUS WITH NOISE SUPPRESSING FUNCTION AND METHOD OF OPERATING THE SAME

BACKGROUND OF THE INVENTION

1. Field of the Invention

The present invention relates to a touch apparatus, and more particularly, to an optical touch apparatus capable of effectively preventing the cross talk effect caused by the high arrangement density of the light sensors via the noise suppressing module and operating method thereof.

2. Description of the Prior Art

Recently, with the developing of image display related technology, there are various new types of display apparatus shown on the market to replace the conventional CRT monitor gradually. Wherein, the touch liquid crystal display has advantages such as power saving, smaller size, and inputting by touching directly, therefore, the touch liquid crystal display is popular to the ordinary consumers and becomes the main stream of the display market. The touch liquid crystal display is widely used in various types of electronic products, for example, an Automated Teller Machine (ATM), a point-of-sale (POS) terminal, a visitor navigation system, or an industrial controlling system.

In general, the current touch apparatus, such as a resistance touch apparatus, a capacitance touch apparatus, and an optical touch apparatus, can detect one touch point or more touch points through different detection theorems or ways. In the various types of touch apparatus mentioned above, because the optical touch apparatus has a characteristic of good transmittance; it has become another well-used technology different from the resistance touch apparatus and the capacitance touch apparatus.

Please refer to FIG. 1. FIG. 1 shows a scheme diagram of the conventional optical touch apparatus. As shown in FIG. 1, the conventional optical touch apparatus 1 includes light emitters 10a~10d, light sensors 12a~12d and a panel 14, wherein the light emitters 10a~10d and the light sensors 12a~12d are set at two different sides on the panel 14, and the light sensors 12a~12d correspond to the light emitters 10a~10d respectively.

However, as shown in FIG. 1, a beam emitted from the light emitter 10c includes a plurality of sensing rays. The sensing rays L1~L3 shown in FIG. 1 are three of the plurality of sensing rays. Once the light sensors 12a~12d or the light emitters 10a~10d are arranged very closely, it is possible that some outer large-angled sensing rays (e.g., L1 and L3 shown in FIG. 1) among the plurality of sensing rays are received by the light sensors 12d and 12b near the light sensor 12c respectively instead of being received by the light sensor 12c corresponding to the light emitter 10c. In this way, the light cross talk effect will be generated, and the accuracy of the conventional optical touch apparatus 1 to determine the touch point position will be seriously affected.

Therefore, the invention provides an optical touch apparatus and operating method thereof to solve the aforementioned problems.

SUMMARY OF THE INVENTION

The present invention provides an optical touch apparatus capable of effectively preventing the cross talk effect caused by the high arrangement density of the light sensors via the noise suppressing module and operating method thereof.

An embodiment of the invention is an optical touch apparatus. In this embodiment, the optical touch apparatus includes a light emitting module, a light sensing module, a noise suppressing module, and a processing module. Wherein, the light emitting module and the light sensing module are set at a first side and a second side of a surface of the optical touch apparatus respectively; the noise suppressing module is set at the second side and in front of a plurality of light sensors of the light sensing module. The light emitting module emits at least one sensing beam comprising a plurality of sensing rays. If an emitting angle of a specific sensing ray among the plurality of sensing rays toward a light sensor of the plurality of light sensors is larger than a default value, the specific sensing ray will be considered as noise and the noise suppressing module will block the specific sensing ray from emitting into the light sensor. After the light sensing module generates a sensing result according to the condition of the light sensing module receiving the at least one sensing beam, the processing module will determine the position of a touch point according to the sensing result.

Another embodiment of the invention is also an optical touch apparatus. In this embodiment, the optical touch apparatus includes a light emitting module, a light sensing module, a noise suppressing module, and a processing module. Wherein, the light emitting module and the light sensing module are set at a first side and a second side of a surface of the optical touch apparatus respectively; the noise suppressing module is set at the first side and in front of a plurality of light emitters of the light emitting module. The light emitting module emits at least one sensing beam comprising a plurality of sensing rays. If an emitting angle of a specific sensing ray among the plurality of sensing rays toward the light sensing module is larger than a default value, the specific sensing ray will be considered as noise and the noise suppressing module will block the specific sensing ray from emitting into the light sensing module. After the light sensing module generates a sensing result according to the condition of the light sensing module receiving the at least one sensing beam, the processing module will determine the position of a touch point according to the sensing result.

Another embodiment of the invention is an optical touch apparatus operating method. In this embodiment, the optical touch apparatus includes a light emitting module, a light sensing module, a noise suppressing module, and a processing module. Wherein, the light emitting module and the light sensing module are set at a first side and a second side of a surface of the optical touch apparatus respectively; the noise suppressing module is set at the second side and in front of a plurality of light sensors of the light sensing module, or set at the first side and in front of a plurality of light emitters of the light emitting module. The method includes the steps of: (a) the light emitting module emits at least one sensing beam comprising a plurality of sensing rays; (b) if an emitting angle of a specific sensing ray among the plurality of sensing rays toward a light sensor of the plurality of light sensors is larger than a default value, the specific sensing ray will be considered as noise and the noise suppressing module will block the specific sensing ray from emitting into the light sensor; (c) the light sensing module generates a sensing result according to the condition of the light sensing module receiving the at least one sensing beam; (d) the processing module will determine the position of a touch point according to the sensing result.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

Figures 4A, 4B:
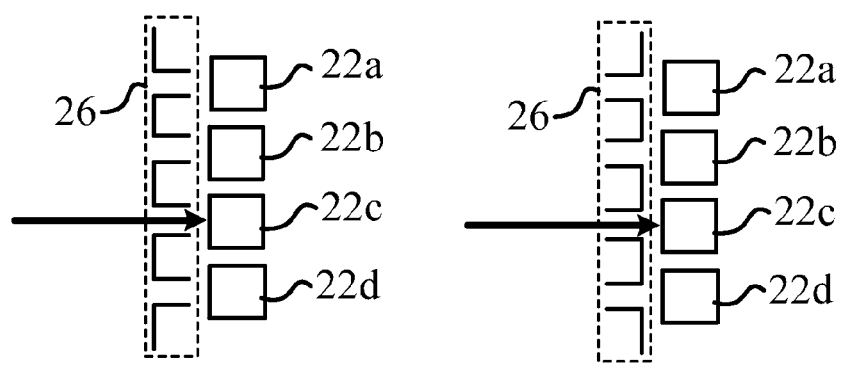

FIG. 4(A) and FIG. 4(B) illustrate scheme diagrams of different appearances of the openings in the noise suppressing module.

Figure 5A:
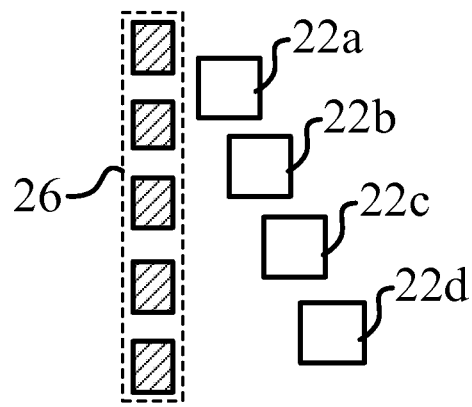
Figure 5B:
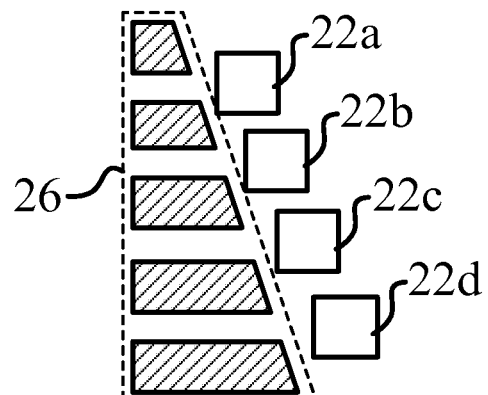
Figure 5C:
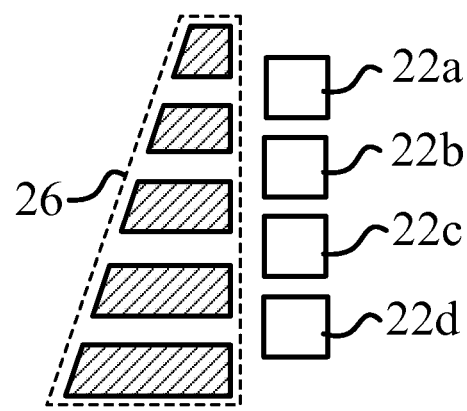

FIG. 5(A)~FIG. 5(C) illustrate scheme diagrams of changing the design of the plurality of openings according to different arrangements of the light sensors.

Figure 6:
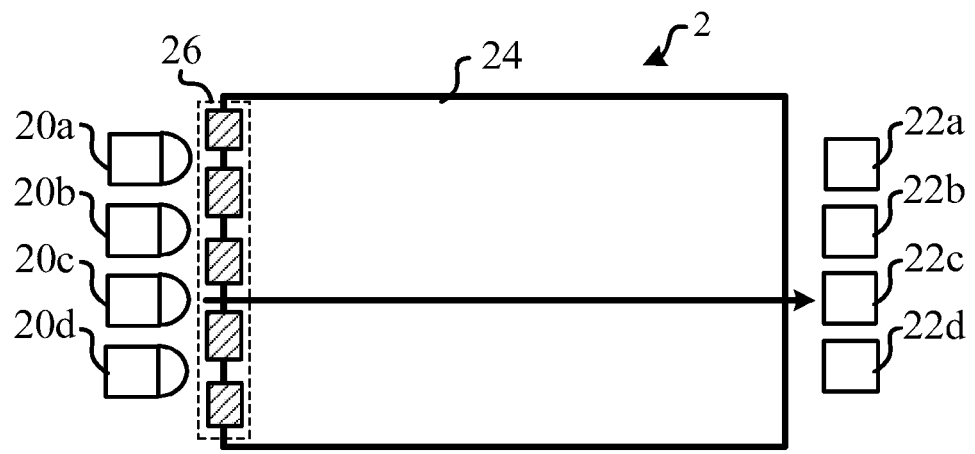

FIG. 6 illustrates a scheme diagram of the noise suppressing module of the optical touch apparatus set at the same side of the light emitting module and in front of the light emitters.

Figure 7:
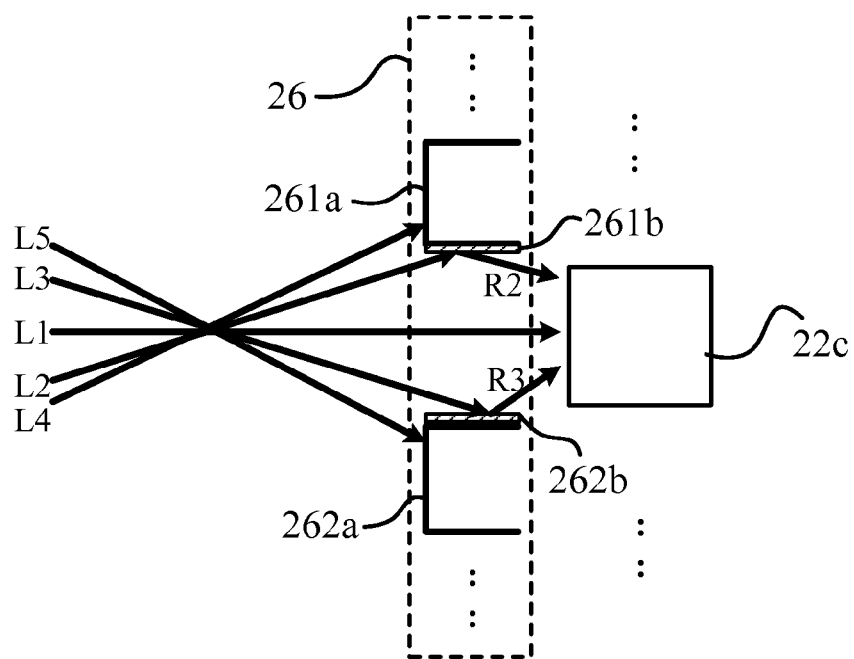

FIG. 7 illustrates a scheme diagram of coating the light absorption material and the light reflection material on different surfaces of the noise suppressing module respectively.

Figure 8:
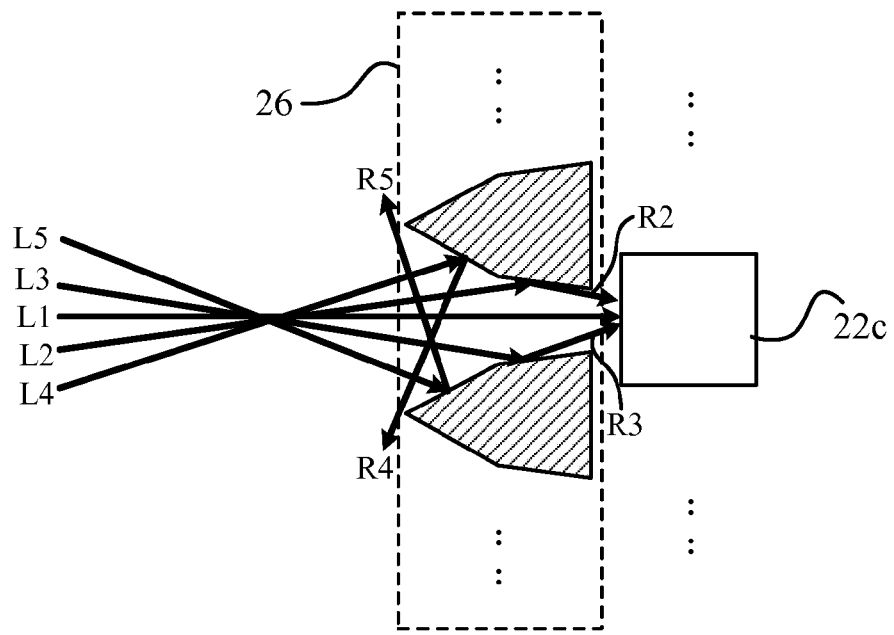
Figure 9:
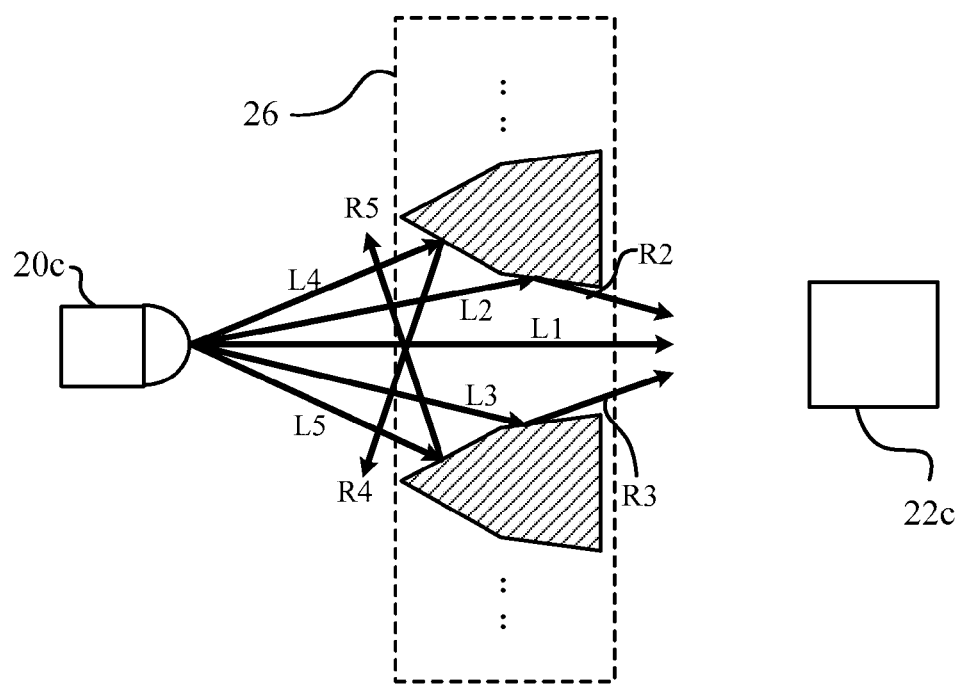

FIG. 8 and FIG. 9 illustrate scheme diagrams of the noise suppressing module with two-stage slope opening set in front of the light sensor or the light emitter.

Figure 10:
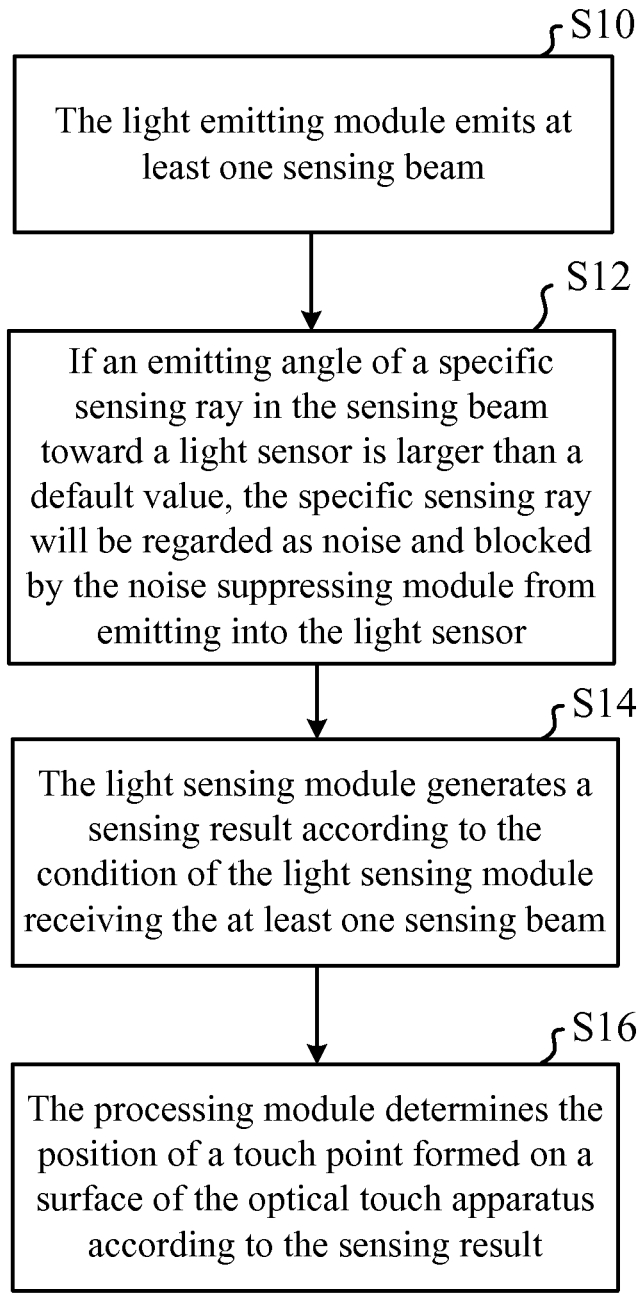

FIG. 10 illustrates a flowchart of the optical touch apparatus operating method in another embodiment of the invention.

DETAILED DESCRIPTION OF THE INVENTION

Figure 1:
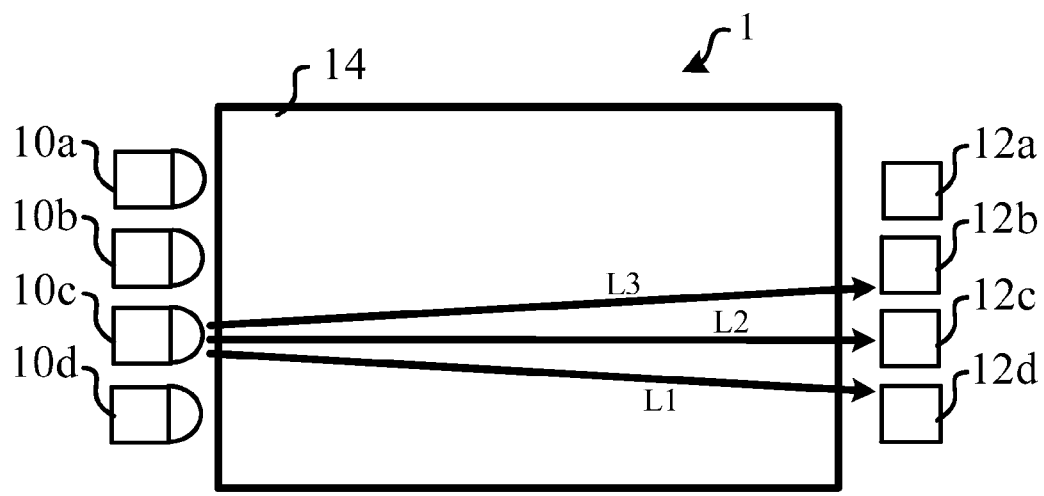
FIG. 1 illustrates a scheme diagram of the conventional optical touch apparatus.
Figure 2:
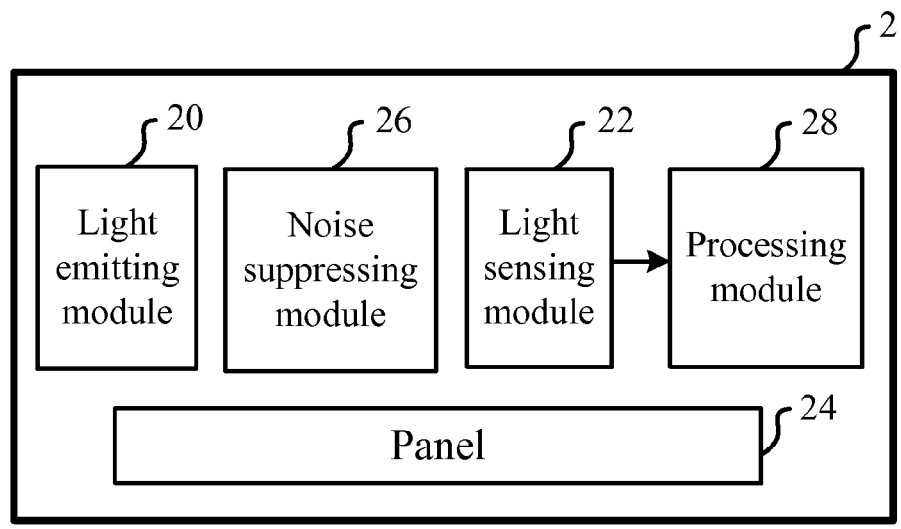
FIG. 2 and FIG. 3 illustrate a functional block diagram and a scheme diagram of the optical touch apparatus in the first embodiment of the invention respectively.
Figure 3:
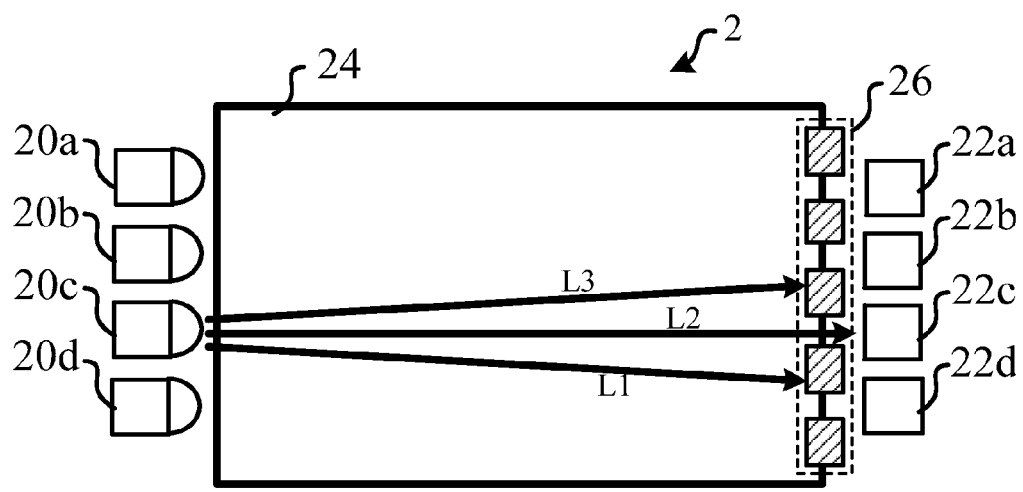

An embodiment of the invention is an optical touch apparatus. Please refer to FIG. 2 and FIG. 3. FIG. 2 and FIG. 3 illustrate a functional block diagram and a scheme diagram of the optical touch apparatus respectively. As shown in FIG. 2, the optical touch apparatus 2 includes a light emitting module 20, a light sensing module 22, a panel 24, a noise suppressing module 26, and a processing module 28. Wherein, the light sensing module 22 is coupled to the processing module 28.

As shown in FIG. 3, the light emitting module 20 includes four light emitters 20a~20d and the light sensing module 22 includes four light sensors 22a~22d. The light emitters 20a~20d and the light sensors 22a~22d are set at two sides of the panel 24 respectively, the light sensors 22a~22d correspond to the light emitters 20a~20d respectively. In fact, the number of the light emitters of the light emitting module 20 and the number of the light sensors of the light sensing module 22 can be determined based on practical needs, not limited to this case.

In this embodiment, the noise suppressing module 26 is set at the same side with the light sensing module 22, and the noise suppressing module 26 is set in front of the light sensor 22a~22d to achieve the noise suppression effect. As shown in FIG. 3, the noise suppressing module 26 has four openings, and the positions of these four openings correspond to the light sensor 22a~22d. It is assumed that the light emitter 20c emits a sensing beam including a plurality of sensing rays, the different sensing rays L1~L3 shown in FIG. 3 will be included in the plurality of sensing rays. Wherein, because the sensing ray L2 is emitted from the light emitter 20c in parallel toward the corresponding light sensor 22c, therefore, the sensing ray L2 can pass the opening corresponding to the light sensor 22c in the noise suppression module 26 and emitted to the light sensor 22c.

As to the sensing ray L1, because the emitting angle of the sensing ray L1 emitting toward the light sensor 22c is larger than that of the sensing ray L2, and the sensing ray L1 is outer than the sensing ray L2 in the sensing beam, if this emitting angle is larger than a default value, it means that the sensing ray L1 may be tilted and emitted to the light sensor 22d next to the light sensor 22c. That is to say, for the light sensor 22d, the sensing ray L1 is unnecessary noise, so that the noise suppressing module 26 will block the emitting of the sensing ray L1 to prevent the sensing ray L1 entering into the light sensor 22d to generate a wrong touch point sensing result. In fact, the above-mentioned default value can be set by the user or the system based on the practical needs without any limitations.

In the same way, because the emitting angle of the sensing ray L3 emitting toward the light sensor 22c is larger than that of the sensing ray L2, and the sensing ray L3 is outer than the sensing ray L2 in the sensing beam, if this emitting angle is larger than a default value, it means that the sensing ray L3 may be tilted and emitted to the light sensor 22b next to the light sensor 22c. That is to say, for the light sensor 22b, the sensing ray L3 is unnecessary noise, so that the noise suppressing module 26 will block the emitting of the sensing ray L3 to prevent the sensing ray L3 entering into the light sensor 22b to generate a wrong touch point sensing result.

In practical applications, the appearance of the openings of the noise suppressing module 26 can be designed to be lordosis (as shown in FIG. 4(A)), internal shrinkage (as shown in FIG. 4(B)), wedge-shaped (as shown in FIG. 5(B)), or any other types without any limitations. In addition, the design of the openings of the noise suppressing module 26 can be also correspondingly changed based on the different arrangements of the light sensors 22a~22d, as shown in FIG. 5(A)~(C).

Then, the light sensing module 22 will generate a sensing result according to the condition of the light sensing module 22 receiving the at least one sensing beam. The processing module 28 will determine the position of a touch point on the surface of the panel 25 according to the sensing result.

It should be noticed that the noise suppressing module 26 can be not only set at the same side with the light sensing module 22 and in front of the light sensors 22a~22d, in practical applications, but also set at the same side with the light emitting module 20 and in front of the light emitters 20a~20d, good noise suppression effect can be also achieved. Please refer to FIG. 6. FIG. 6 shows a scheme diagram of the noise suppressing module 26 set at the same side with the light emitting module 20 and in front of the light emitters 20a~20d.

As shown in FIG. 6, because the noise suppressing module 26 is set at the same side with the light emitting module 20 and in front of the light emitters 20a~20d, if the emitting angle of a specific sensing ray of the sensing beam emitted from the light emitter 20c of the light emitting module 20 toward the light sensor 22c of the light sensing module 22 is larger than the default value, it means that the specific sensing ray may be tilted and emitted toward other light sensors 22b and 22d next to the light sensor 22c, so that the specific sensing ray will be considered as noise, and the noise suppressing module 26 will block the specific sensing ray. Therefore, only when the emitting angle of the specific sensing ray emitting toward the light sensor 22c of the light sensing module 22 is smaller than the default value, the specific sensing ray will smoothly pass the opening of the noise suppressing module 26 and emitted into the light sensor 22c.

Please refer to FIG. 7. FIG. 7 illustrates a scheme diagram of coating the light absorption material and the light reflection material on different surfaces of the noise suppressing module 26 respectively. As shown in FIG. 7, in the noise suppressing module 26, the upper surface 261b and the lower surface 262b of the opening corresponding to the light sensor 22c are coated with the light reflection material. Since the emitting angle of the sensing rays L2 and L3 are smaller than the default value, so that the upper surface 261b and the lower surface 262b coated with the light reflection material can reflect the sensing rays L2 and L3 to be the reflected rays R2 and R3 respectively. Accordingly, the small angle sensing ray receiving strength of the light sensor 22c can be increased, so that the sensing result of the light sensor 22c can be more accurate.

Furthermore, if the upper surface 261b and the lower surface 262b of the noise suppressing module 26 are coated with the light absorption material, and the sensing rays L4 and L5 with emitting angle larger than the default value are emitted to the surfaces 261a and 262a, therefore, the surfaces 261a and 262a will absorb the sensing ray L4 and L5 to prevent the sensing ray L4 and L5 considered as noise of the light sensor 22c from emitting toward the light sensor 22c, so that the noise suppression effect will become better.

Please refer to FIG. 8. FIG. 8 illustrates a scheme diagram of the noise suppressing module 26 with two-stage slope opening set in front of the light sensor 22c. As shown in FIG. 8, it is assumed that the emitting angles of the sensing rays L1~L3 are all smaller than the default value, wherein the sensing ray L1 can be directly emitted to the light sensor 22c instead of being blocked by the noise suppressing module 26, and the sensing rays L2 and L3 will be reflected by the noise suppressing module 26 to become the reflected rays R2 and R3 emitted toward the light sensor 22c. The sensing rays L4 and L5 with emitting angles larger than the default value will be reflected by the noise suppressing module 26 to become the reflected rays R3 and R5 away from the light sensor 22c to achieve the noise suppression effect.

In the same way, FIG. 9 illustrates a scheme diagram of the noise suppressing module 26 with two-stage slope opening set in front of the light emitter 20c. As shown in FIG. 9, it is assumed that the emitting angles of the sensing rays L1~L3 emitted from the light emitter 20c are all smaller than the default value, wherein the sensing ray L1 can be directly emitted to the light sensor 22c instead of being blocked by the noise suppressing module 26, and the sensing rays L2 and L3 will be reflected by the noise suppressing module 26 to become the reflected rays R2 and R3 emitted toward the light sensor 22c. The sensing rays L4 and L5 with emitting angles larger than the default value will be reflected by the noise suppressing module 26 to become the reflected rays R3 and R5 away from the light sensor 22c to achieve the noise suppression effect.

It should be noticed that the various types of optical touch apparatus mentioned above can have different configurations and positions, they are only preferred embodiments of the invention, actually there are still other types of configurations and positions, not limited to this case.

Another embodiment of the invention is an optical touch apparatus operating method. In this embodiment, the optical touch apparatus includes a light emitting module, a light sensing module, a noise suppressing module, and a processing module. Wherein, the light emitting module and the light sensing module are set at a first side and a second side of a surface of the optical touch apparatus respectively. In fact, the noise suppressing module can be set at the second side and in front of a plurality of light sensors of the light sensing module, or set at the first side and in front of a plurality of light emitters of the light emitting module, but not limited to this case.

Please refer to FIG. 10. FIG. 10 illustrates a flowchart of the optical touch apparatus operating method. As shown in FIG. 10, at first, in step S10, the light emitting module emits at least one sensing beam comprising a plurality of sensing rays.

Next, in step S12, if an emitting angle of a specific sensing ray among the plurality of sensing rays toward a light sensor of the plurality of light sensors is larger than a default value, the specific sensing ray will be considered as noise and the noise suppressing module will block the specific sensing ray from emitting into the light sensor. In step S14, the light sensing module generates a sensing result according to the condition of the light sensing module receiving the at least one sensing beam. As last, in step S16, the processing module will determine the position of a touch point according to the sensing result.

Compared to the prior arts, the optical touch apparatus and the optical touch apparatus operating method of the invention can effectively prevent the cross talk effect caused by the high arrangement density of the light sensors and the light emitters via the different types of noise suppressing modules, so that the touch point detecting accuracy of the optical touch apparatus can be largely increased.

Although the present invention has been illustrated and described with reference to the preferred embodiment thereof, it should be understood that it is in no way limited to the details of such embodiment but is capable of numerous modifications within the scope of the appended claims.

What is claimed is:

1. An optical touch apparatus, comprising:
a light emitting module, set at a first side of a surface of the optical touch apparatus, for emitting at least one sensing beam comprising a plurality of sensing rays;
a light sensing module, set at a second side different from the first side on the surface, the light sensing module comprising a plurality of light sensors;
a noise suppressing module, set at the second side and in front of the plurality of light sensors of the light sensing module, the noise suppressing module having a plurality of noise suppressing units arranged corresponding to the plurality of light sensors, and the plurality of noise suppressing units being opaque, a first noise suppressing unit of the plurality of noise suppressing units corresponding to a first light sensor of the plurality of light sensors and comprising a first portion and a second portion having different shapes, and the second portion being closer to the first light sensor than the first portion, if a specific sensing ray among the plurality of sensing rays is emitted to the first portion of the first noise suppressing unit, the specific sensing ray will be reflected away from the first light sensor by the first portion; if the specific sensing ray is emitted to the second portion of the first noise suppressing unit, the specific sensing ray will be reflected into the first light sensor by the second portion; and
a processing module, coupled to the light sensing module, after the light sensing module generates a sensing result according to the condition of the light sensing module receiving the at least one sensing beam, the processing module determining the position of a touch point according to the sensing result.

2. The optical touch apparatus of claim 1, wherein if an emitting angle of the specific sensing ray toward the first light sensor is larger than a default value, the specific sensing ray is reflected by the first noise suppressing unit instead of being emitted into the first light sensor, if the emitting angle of the specific sensing ray toward the first light sensor is smaller than the default value and the specific sensing ray is emitted to the first noise suppressing unit, the first noise suppressing unit reflects the specific sensing ray to the first light sensor to increase the receiving strength of the first light sensor.

3. The optical touch apparatus of claim 1, wherein the noise suppressing module comprises a plurality of openings, the positions of the plurality of openings correspond to the plurality of light sensors respectively.

4. The optical touch apparatus of claim 3, wherein the appearance of the plurality of openings is designed to be lordosis, internal shrinkage, or wedge-shaped.

5. The optical touch apparatus of claim 3, wherein the design of the plurality of openings is changed according to the arrangement of the plurality of light sensors.

6. The optical touch apparatus of claim 1, wherein the plurality of noise suppressing units comprises a second noise suppressing unit adjacent to the first noise suppressing unit and the second noise suppressing unit also corresponds to the first light sensor, the second noise suppressing unit comprises a third portion and a fourth portion having different shapes, the third portion and the fourth portion are disposed corresponding to the first portion and the second portion respectively, and the fourth portion is closer to the first light sensor than the third portion; if the specific sensing ray is emitted to the third portion of the second noise suppressing unit, the specific sensing ray will be reflected away from the first light sensor by the third portion; if the specific sensing ray is emitted to the fourth portion of the second noise suppressing unit, the specific sensing ray will be reflected into the first light sensor by the fourth portion.

7. The optical touch apparatus of claim 1, wherein a surface of the noise suppressing module is coated with a light absorption material, when the emitting angle of the specific sensing ray toward the light sensor is larger than the default value and the specific sensing ray is emitted to the surface of the noise suppressing module, the surface absorbs the specific sensing ray to stop the specific sensing ray into the light sensor.

8. An optical touch apparatus, comprising:
a light emitting module, set at a first side of a surface of the optical touch apparatus, for emitting at least one sensing beam comprising a plurality of sensing rays;
a light sensing module, set at a second side different from the first side on the surface;
a noise suppressing module, set at the first side and in front of a plurality of light emitters of the light emitting module, the noise suppressing module having a plurality of noise suppressing units arranged corresponding to the plurality of light emitters, and the plurality of noise suppressing units being opaque, a first noise suppressing unit of the plurality of noise suppressing units corresponding to a first light emitter of the plurality of light emitters and comprising a first portion and a second portion having different shapes, and the first portion being closer to the first light emitter than the second portion, if a specific sensing ray among the plurality of sensing rays is emitted to the first portion of the first noise suppressing unit, the specific sensing ray will be reflected away from the light sensing module by the first portion; if the specific sensing ray is emitted to the second portion of the first noise suppressing unit, the specific sensing ray will be reflected into the light sensing module by the second portion; and
a processing module, coupled to the light sensing module, after the light sensing module generates a sensing result according to the condition of the light sensing module receiving the at least one sensing beam, the processing module determining the position of a touch point according to the sensing result.

9. The optical touch apparatus of claim 8, wherein if an emitting angle of the specific sensing ray among the plurality of sensing rays toward the light sensing module is larger than a default value, the specific sensing ray is reflected by the first noise suppressing unit instead of being emitted into the light sensing module, if the emitting angle of the specific sensing ray toward the light sensing module is smaller than the default value and the specific sensing ray is emitted to the first noise suppressing unit, the first noise suppressing unit reflects the specific sensing ray to the light sensing module.

10. The optical touch apparatus of claim 8, wherein the noise suppressing module comprises a plurality of openings, the positions of the plurality of openings correspond to the plurality of light emitters respectively.

11. The optical touch apparatus of claim 10, wherein the appearance of the plurality of openings is designed to be lordosis, internal shrinkage, or wedge-shaped.

12. The optical touch apparatus of claim 10, wherein the design of the plurality of openings is changed according to the arrangement of the plurality of light emitters.

13. The optical touch apparatus of claim 8, wherein the plurality of noise suppressing units comprises a second noise suppressing unit adjacent to the first noise suppressing unit and the second noise suppressing unit also corresponds to the first light emitter, the second noise suppressing unit comprises a third portion and a fourth portion having different shapes, the third portion and the fourth portion are disposed corresponding to the first portion and the second portion respectively, and the third portion is closer to the first light emitter than the fourth portion; if the specific sensing ray is emitted to the third portion of the second noise suppressing unit, the specific sensing ray will be reflected away from the light sensing module by the third portion; if the specific sensing ray is emitted to the fourth portion of the second noise suppressing unit, the specific sensing ray will be reflected into the light sensing module by the fourth portion.

14. The optical touch apparatus of claim 8, wherein a surface of the noise suppressing module is coated with a light absorption material, when the emitting angle of the specific sensing ray toward the light sensor is larger than the default value and the specific sensing ray is emitted to the surface of the noise suppressing module, the surface absorbs the specific sensing ray to stop the specific sensing ray into the light sensor.

15. A method of operating an optical touch apparatus, the optical touch apparatus comprising a light emitting module, a light sensing module, a noise suppressing module, and a processing module, the light emitting module and the light sensing module being set at a first side and a second side of a surface of the optical touch apparatus respectively, the noise suppressing module being set at the second side and in front of a plurality of light sensors of the light sensing module, the noise suppressing module having a plurality of noise suppressing units arranged corresponding to the plurality of light sensors, and the plurality of noise suppressing units being opaque, a first noise suppressing unit of the plurality of noise suppressing units corresponding to a first light sensor of the plurality of light sensors and comprising a first portion and a second portion having different shapes, and the second portion being closer to the first light sensor than the first portion, the method comprising the steps of:
the light emitting module emitting at least one sensing beam comprising a plurality of sensing rays;
if a specific sensing ray among the plurality of sensing rays is emitted to the first portion of the first noise suppressing unit, the specific sensing ray will be reflected away from the first light sensor by the first portion;

if the specific sensing ray is emitted to the second portion of the first noise suppressing unit, the specific sensing ray will be reflected into the first light sensor by the second portion;

the light sensing module generating a sensing result according to the condition of the light sensing module receiving the at least one sensing beam; and the processing module determining the position of a touch point according to the sensing result.

16. The method of claim 15, wherein if an emitting angle of the specific sensing ray toward the first light sensor is larger than a default value, the specific sensing ray is reflected by the first noise suppressing unit instead of being emitted into the first light sensor, if the emitting angle of the specific sensing ray toward the first light sensor is smaller than the default value and the specific sensing ray is emitted to the first noise suppressing unit, the first noise suppressing unit reflects the specific sensing ray to the first light sensor to increase the receiving strength of the first light sensor.

17. The method of claim 15, wherein the noise suppressing module comprises a plurality of openings, the positions of the plurality of openings correspond to the plurality of light sensors respectively.

18. The method of claim 17, wherein the appearance of the plurality of openings is designed to be lordosis, internal shrinkage, or wedge-shaped.

19. The method of claim 17, wherein the design of the plurality of openings is changed according to the arrangement of the plurality of light sensors.

20. The method of claim 15, wherein the plurality of noise suppressing units comprises a second noise suppressing unit adjacent to the first noise suppressing unit and the second noise suppressing unit also corresponds to the first light sensor, the second noise suppressing unit comprises a third portion and a fourth portion having different shapes, the third portion and the fourth portion are disposed corresponding to the first portion and the second portion respectively, and the fourth portion is closer to the first light sensor than the third portion; if the specific sensing ray is emitted to the third portion of the second noise suppressing unit, the specific sensing ray will be reflected away from the first light sensor by the third portion; if the specific sensing ray is emitted to the fourth portion of the second noise suppressing unit, the specific sensing ray will be reflected into the first light sensor by the fourth portion.

21. The method of claim 15, wherein a surface of the noise suppressing module is coated with a light absorption material, when the emitting angle of the specific sensing ray toward the light sensor is larger than the default value and the specific sensing ray is emitted to the surface of the noise suppressing module, the surface absorbs the specific sensing ray to stop the specific sensing ray into the light sensor.

22. A method of operating an optical touch apparatus, the optical touch apparatus comprising a light emitting module, a light sensing module, a noise suppressing module, and a processing module, the light emitting module and the light sensing module being set at a first side and a second side of a surface of the optical touch apparatus respectively, the noise suppressing module being set at the first side and in front of a plurality of light emitters of the light emitting module, the noise suppressing module having a plurality of noise suppressing units arranged corresponding to the plurality of light emitters, and the plurality of noise suppressing units being opaque, a first noise suppressing unit of the plurality of noise suppressing units corresponding to a first light emitter of the plurality of light emitters and comprising a first portion and a second portion having different shapes, and the first portion being closer to the first light emitter than the second portion, the method comprising the steps of:

the light emitting module emitting at least one sensing beam comprising a plurality of sensing rays;

if a specific sensing ray among the plurality of sensing rays is emitted to the first portion of the first noise suppressing unit, the specific sensing ray will be reflected away from the light sensing module by the first portion; if the specific sensing ray is emitted to the second portion of the first noise suppressing unit, the specific sensing ray will be reflected into the light sensing module by the second portion;

the light sensing module generating a sensing result according to the condition of the light sensing module receiving the at least one sensing beam; and the processing module determining the position of a touch point according to the sensing result.

23. The method of claim 22, wherein if an emitting angle of the specific sensing ray among the plurality of sensing rays toward the light sensing module is larger than a default value, the specific sensing ray is reflected by the first noise suppressing unit instead of being emitted into the light sensing module, if the emitting angle of the specific sensing ray toward the light sensing module is smaller than the default value and the specific sensing ray is emitted to the first noise suppressing unit, the first noise suppressing unit reflects the specific sensing ray to the light sensing module.

24. The method of claim 22, wherein the noise suppressing module comprises a plurality of openings, the positions of the plurality of openings correspond to the plurality of light emitters respectively.

25. The method of claim 24, wherein the appearance of the plurality of openings is designed to be lordosis, internal shrinkage, or wedge-shaped.

26. The method of claim 24, wherein the design of the plurality of openings is changed according to the arrangement of the plurality of light emitters.

27. The method of claim 22, wherein the plurality of noise suppressing units comprises a second noise suppressing unit adjacent to the first noise suppressing unit and the second noise suppressing unit also corresponds to the first light emitter, the second noise suppressing unit comprises a third portion and a fourth portion having different shapes, the third portion and the fourth portion are disposed corresponding to the first portion and the second portion respectively, and the third portion is closer to the first light emitter than the fourth portion; if the specific sensing ray is emitted to the third portion of the second noise suppressing unit, the specific sensing ray will be reflected away from the light sensing module by the third portion; if the specific sensing ray is emitted to the fourth portion of the second noise suppressing unit, the specific sensing ray will be reflected into the light sensing module by the fourth portion.

28. The method of claim 22, wherein a surface of the noise suppressing module is coated with a light absorption material, when the emitting angle of the specific sensing ray toward the light sensor is larger than the default value and the specific sensing ray is emitted to the surface of the noise suppressing module, the surface absorbs the specific sensing ray to stop the specific sensing ray into the light sensor.

* * * * *